UNITED STATES PATENT OFFICE.

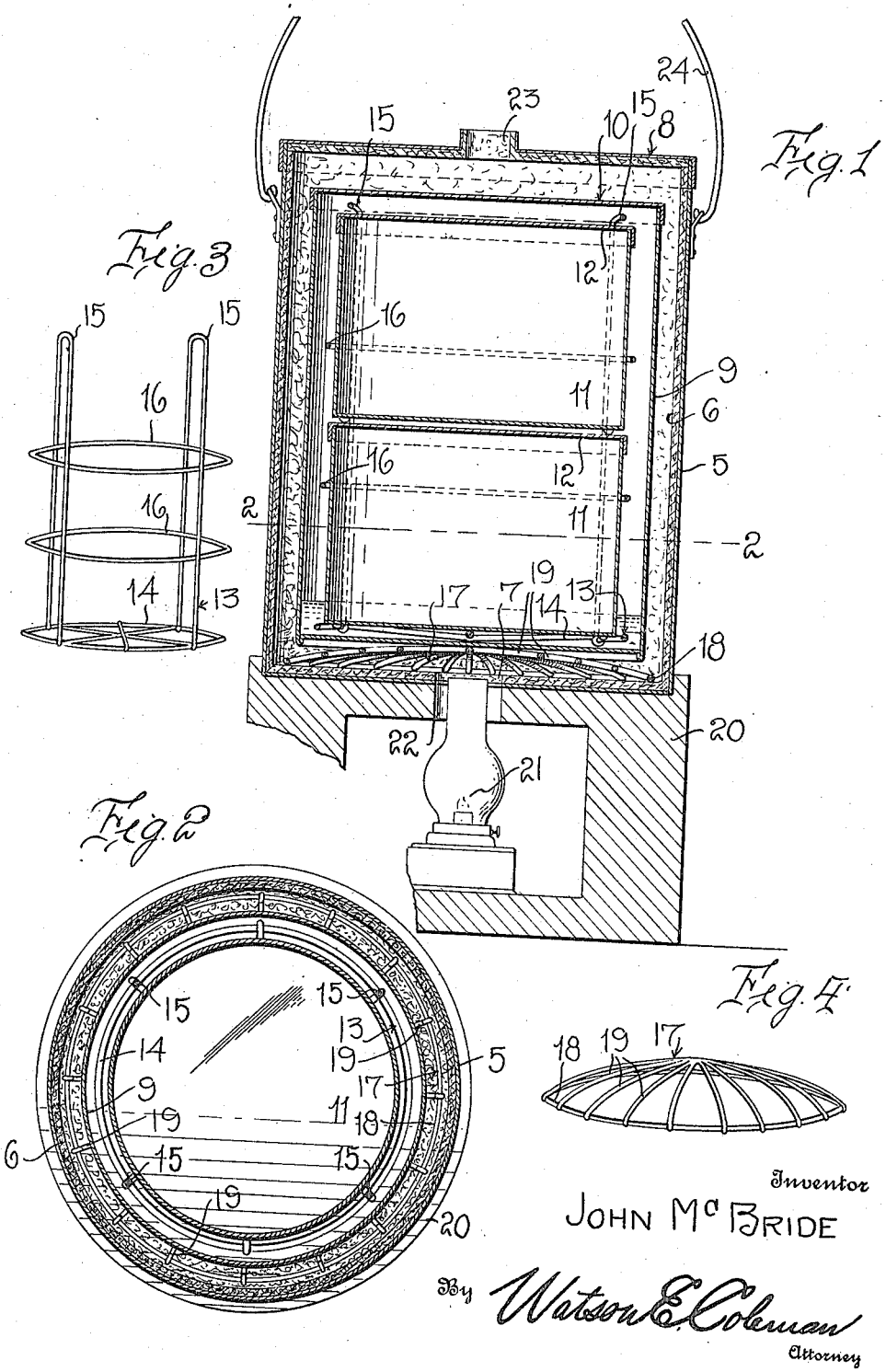

JOHN McBRIDE, OF CHILLICOTHE, MISSOURI.

STEAM-COOKER.

1,216,336.  Specification of Letters Patent.  Patented Feb. 20, 1917.

Application filed May 10, 1916.  Serial No. 96,652.

*To all whom it may concern:*

Be it known that I, JOHN McBRIDE, a citizen of the United States, residing at Chillicothe, in the county of Livingston and State of Missouri, have invented certain new and useful Improvements in Steam-Cookers, of which the following is a specification, reference being had to the accompanying drawings.

This invention relates to an improved steam cooker for household use and has for its primary object to provide a device whereby foods may be quickly and thoroughly cooked with a minimum consumption of fuel.

It is a more particular object of the invention to provide a device for the above purpose embodying an outer shell or jacket, said jacket being centrally provided with an opening in its base wall, a circular, convexly curved, wire grate arranged in the jacket, a cylindrical chamber adapted to be arranged upon said grate to receive a small quantity of water for the generation of steam, food containers adapted to be arranged within said chamber, and a support for said jacket having a lamp or other heating means mounted therein.

The invention has for another important object to provide improved means for readily placing the food containers within the heating chamber or removing the same therefrom.

It is a further general object of the invention to improve and simplify the construction of devices of the above character, whereby the same can be produced at relatively small manufacturing cost and to provide such a device which will be very serviceable and convenient in practical use.

With the above and other objects in view, my invention consists in the novel features of construction, combination and arrangement of parts to be hereinafter more fully described, claimed and illustrated in the accompanying drawing, in which, Figure 1 is a vertical sectional view of my improved steam cooker;

Fig. 2 is a horizontal section taken on the line 2—2 of Fig. 1;

Fig. 3 is a perspective view of the wire supporting grate;

Fig. 4 is a similar view of the rack for the food container.

Referring in detail to the drawing, 5 designates the outer cylindrical jacket preferably constructed of galvanized iron and having an insulating sheet of asbestos or other suitable material indicated at 6, secured upon the inner surfaces of its vertical wall and the base wall thereof. The base wall of this jacket is centrally provided with a circular opening 7, and 8 designates a removable cover or closure for the upper end of the jacket. This cover is formed with an annular flange on its outer edge for tight frictional engagement over the upper edge of the vertical wall of said jacket, and is also lined with asbestos.

The heating chamber 9 is also of cylindrical form and is preferably constructed of aluminum. This chamber likewise is provided with a top or cover 10 frictionally engaging upon the upper open end thereof, whereby the chamber may be securely closed. The food containers 11 may be constructed either of aluminum or copper or of enameled ware, each of said containers having a cover 12. The heating chamber 9 may be of any desired size so as to contain two or more of the food containers 11. For the purpose of conveniently arranging the containers within the heating chamber or removing the same therefrom, I provide a wire rack 13 which is preferably of the form indicated in Fig. 4 of the drawing, and consists of a wire base 14 and diametrically opposed, vertical handle members 15. These vertical handle members are connected at intervals and securely braced by means of the spaced wire rings 16.

17 designates a circular grate which includes a marginal wire ring 18, to which a plurality of intersecting, curved wires 19 are fixed at their extremities. By providing these curved grate wires, when the grate is arranged within the jacket 6 as shown in Fig. 1, the heating chamber 9 resting upon the center of the grate at the intersection of the wires 17 will be supported with its bottom in parallel spaced relation to the base wall of the jacket.

The jacket 6, after the heating chamber and food containers have been arranged therein, is adapted to be mounted upon a suitable supporting base indicated at 20, within which an oil lamp or other heating means 21 is arranged. The lamp flue is disposed immediately in line with the opening 7 which is centrally formed in the base wall of the jacket 5. The top or cover 8 for this jacket is formed with a draft opening 23 so that there will be a sufficient upward draft of air through the jacket to cause heated air to rise and circulate therethrough. A suitable handle 24 is properly attached at its ends to the opposite sides of the jacket 5 whereby the same may be conveniently moved from place to place.

In the practical use of the invention, the heating chamber 9 is supplied with a small amount of water, as indicated in Fig. 1, and the food containers 11 being tightly closed are then arranged in the rack 13 and said rack and containers placed within the heating chamber. The top or cover 10 is then applied to this chamber and the same is arranged upon the wire grate 17 which is disposed within the outer jacket 5. The upper open end of this jacket is then securely closed by means of the cover 8 and the jacket then placed over one of the burners of an oil or gas stove, such as ordinarily used for cooking purposes. In a very few minutes, the water in the heating chamber 9 will be highly heated and the steam rising therefrom will fill the interior of said chamber around the food containers 11. The jacket is then placed upon the base 20, over the lamp 21, and the heated air rising from this lamp through the opening 22 in the bottom of the jacket strikes the bottom wall of the lower container 11 and spreads between the same and the base wall of the jacket. Thus, the water in the chamber is maintained at a high temperature so that the walls of the food containers 11 will become very highly heated and such heat transmitted to the foods within said containers. In this manner, the food will be thoroughly cooked and the expense incident to the consumption of fuel is reduced to a minimum. It is, of course, understood that the cover or closure 10 for the cooking chamber has a sufficiently tight fit upon the wall of the chamber to prevent its displacement by the pressure of steam within the chamber.

From the foregoing description, taken in connection with the accompanying drawing, the construction, manner of use and several advantages of the invention will be clearly and fully understood. The device is exceedingly simple, and may be satisfactorily employed for the cooking of various food stuffs, and especially those which require cooking for a relatively long time under a high degree of heat. The several parts of the invention may be very easily and quickly assembled and placed within the jacket of the cooker or removed therefrom and can be easily cleaned so that the device may be maintained in a thoroughly sanitary condition. While I have referred to the several parts of the device as being of cylindrical form, it is, of course, manifest that the same may also be constructed in various other shapes. The invention is also susceptible of considerable modification in the form, proportion and arrangement of the several features thereof and I, therefore, reserve the privilege of adopting all such legitimate changes as may be fairly embodied within the spirit and scope of the invention as claimed.

Having thus fully described my invention, what I desire to claim and secure by Letters Patent is:—

1. In a steam cooker, an outlet jacket having an opening in its base, a closure for the upper end of said jacket being provided with a draft opening, a heating chamber adapted to contain water, a circular, radially convex supporting member adapted to be arranged in the jacket beneath the heating chamber to support the latter in spaced relation above said opening, a cooking vessel adapted to be removably arranged within said heating chamber, and heating means mounted beneath the opening in the base wall of the jacket.

2. In a cooking apparatus, an outer jacket having insulated side and base walls, said base wall being provided with a central opening, a closure for the upper end of said jacket having a draft opening therein, a heating chamber adapted to contain water, a closure for the upper open end of said chamber, food containers adapted to be arranged within said chamber, a wire grate having a circular marginal wire and a plurality of curved, radially disposed intersecting wires, said grate being adapted to be arranged within said jacket to support the heating chamber in spaced relation above the base wall of the jacket, in combination with a base upon which said jacket is adapted to be arranged, and heating means mounted in the base beneath the opening in the base wall of said jacket.

In testimony whereof I hereunto affix my signature in the presence of two witnesses.

JOHN McBRIDE.

Witnesses:
THOMAS C. GRIFFITHS,
WILLIAM E. KESTER.

Copies of this patent may be obtained for five cents each, by addressing the "Commissioner of Patents, Washington, D. C."